United States Patent [19]

Hsieh et al.

[11] Patent Number: 5,886,113
[45] Date of Patent: Mar. 23, 1999

[54] PROCESS FOR PREPARING AN ELASTOMERIC COPOLYMER COMPOSITION OF MONO-VINYL AROMATIC HYDROCARBONS AND CONJUGATED DIENES

[75] Inventors: Henry Chi-Chen Hsieh; Huan-Chun Kao; Jeff Tsung-Chih Tsai, all of Kaosiung Hsien, Taiwan

[73] Assignee: Taiwan Synthetic Rubber Corporation, Taipei, Taiwan

[21] Appl. No.: 848,100

[22] Filed: Apr. 28, 1997

[51] Int. Cl.$^6$ ........................................ C08F 2/00
[52] U.S. Cl. .................. 526/86; 525/313; 526/87
[58] Field of Search .......... 526/86, 87; 525/313

[56] References Cited

U.S. PATENT DOCUMENTS

| 328,183 | 10/1885 | Burnham et al. . |
|---|---|---|
| 2,281,383 | 10/1942 | Zelinski et al. . |
| 3,231,635 | 1/1966 | Holden et al. . |
| 3,251,905 | 5/1966 | Zelinski et al. . |
| 3,393,182 | 7/1968 | Trepka et al. . |
| 3,427,269 | 2/1969 | Davis et al. . |
| 3,594,452 | 7/1971 | De La Mare et al. . |
| 3,766,301 | 10/1973 | De La Mare et al. . |
| 4,600,749 | 7/1986 | Minekawa et al. . |

*Primary Examiner*—Melvyn I. Marquis
*Attorney, Agent, or Firm*—Merchant, Gould, Smith, Edell, Welter & Schmidt, P.A.

[57] ABSTRACT

A process of preparing an elastomeric copolymer composition of mono-vinyl aromatic hydrocarbon and conjugated diene is disclosed. The composition produced by this process has preferred properties, i.e. the product possesses the characteristics of enhancing ultimate elongation up to 900%, keeping tensile strength in a suitable range and enhancing transparency.

8 Claims, No Drawings

PROCESS FOR PREPARING AN ELASTOMERIC COPOLYMER COMPOSITION OF MONO-VINYL AROMATIC HYDROCARBONS AND CONJUGATED DIENES

The present invention relates to a process for preparing an elastomeric copolymer composition of mono-vinyl aromatic hydrocarbons and conjugated dienes, and to the elastomeric copolymers produced thereby. The elastomeric copolymer according to the present invention possesses the characteristics of enhancing elongatibility ultimately up to 900%, keeping tensile strength within a suitable range and enhancing transparency and adhesive properties.

Di-blocked linear or star-type copolymers of mono-vinyl aromatic hydrocarbon and conjugated diene are well-known and widely used as shoe sole or modified rubber. However, the known material of this type has the drawbacks of inferior transparency and adhesion.

The block copolymer containing conjugated dienes and vinyl aromatic hydrocarbon possesses different properties from those of conventional vulcanization rubbers. The block copolymer possesses comparable physical strength and resilience to that of the vulcanized elastomer under ambient temperature without the aid of vulcanization by curing agents, vulcanizing accelerators or other vulcanizing auxiliaries because of the physical crosslinkage. Additionally, the block copolymer has excellent processability at an elevated temperature similar to a thermoplastic material, thus, it can be processed by injection, extrusion or compression molding processes. Further, the block copolymer can be formulated into various formulations by incorporating suitable thermoplastic resins, such as polystyrene and polyethylene, a softening agent, such as naphthenic oils, and inorganic fillers, such as clay and calcium carbonate, which can be used in the fields of manufacturing shoes or other rubber products, such as toys, window frames, containers, tubing, binders and other modified plastics.

In the manufacturing of an adhesive tape or label, the binder is usually first dissolved in a solvent, then rolled on or sprayed on a substrate. However, this process has numerous drawbacks, such as that the solvent will pollute our environment, and is liable to catch fire, thus, creating an unfavorable working condition. In order to overcome these problems, it is preferable to use a solvent-free binder instead of a solvent-containing binder. Since block copolymers possess excellent balance in adhesion and cohesion, they are a good constituent for forming a binder used in the manufacturing of an adhesive tape or label. U.S. Pat. No. 3,427,269 discloses a binder substantially formed from polystyrene-polybutadiene-polystyrene copolymer or polystyrene-polyisoprene-polystyrene copolymer. However, polystyrene-polybutadiene-polystyrene copolymer has the drawbacks of low tackiness and high peel strength. Additionally, the adhesion and other physical properties of the binder will be destroyed if it is substantially formed from polystyrene-polyisoprene-polystyrene copolymer and processed under a high temperature for a long time.

The process according to the present invention can improve the tackiness of the copolymer formed from polystyrene-polybutadiene-polystyrene, and prevent the occurrence of a thermodegradation phenomenon which is caused by a molecule's shear stress when the copolymer is used under a high temperature for a long time.

U.S. Pat. No. 3,251,905 discloses the use of di-lithium initiator to initiate the polymerization of mono-vinyl aromatic hydrocarbons and conjugated dienes, wherein mono-vinyl aromatic hydrocarbons are added when the conjugated dienes are reacted completely; thus, a copolymer in an A-B-A type can be obtained, wherein the mono-vinyl aromatic hydrocarbon monomer is bonded to the end of the conjugated dienes. However, the di-lithium initiator used in this patent has numerous drawbacks, such as the high cost, the poor stability, the complicated syntheses and the low dissolution in general hydrocarbon solvents. Thus, the physical properties of the thermoplastic rubber produced by a di-lithium initiator are unstable. In order to overcome these problems, the di-lithium initiator must be used in high purity and a great amount of polar organic solvent must be used so as to produce a polymer with stable physical properties. Therefore, in addition to the difficulty of purifying the polymer produced by the '905 process, its elastomeric properties are also inferior due to the amount of the vinyl group generated in the polymer structure.

The term "the amount of vinyl group" used in the text refers to the percent by weight of the total amount of the vinyl group when the copolymerized conjugated dienes are polymerized at position 1,2- or 3,4-. For example, if the conjugated diene is 1,3-butadiene, the amount of vinyl group refers to the group at position 1,2-, if the conjugated diene is isoprene, the mount of vinyl group refers to the total amounts of the vinyl groups at positions 1,2- and 3,4-.

U.S. Pat. No. 3,231,635 discloses a polymerization process whereas mono-vinyl aromatic hydrocarbons are firstly polymerized with a mono-lithium initiator, then conjugated dienes are added, and at last, mono-vinyl aromatic hydrocarbon are added again. This process can produce a thermoplastic elastomer in a type of A-B-A. However, this polymerization process characterized by the addition of all monomers in three steps has the drawback of the existence of impurities which will inactivate the polymerization reaction, and make the transparency inferior. Additionally, the polymerization reaction of the mono-vinyl aromatic hydrocarbon added at the third step has difficult in reacting completely, thus, it is difficult to obtain a product with a homogeneous structure and stable features.

As to the current process of preparing a block copolymer of mono-vinyl aromatic hydrocarbons with conjugated dienes, the mono-vinyl aromatic hydrocarbons are first initiated and polymerized with an organic mono-lithium initiator, the conjugated dienes are then added, and a coupling agent is added at last to proceed with a coupling reaction. This process can prepare a thermoplastic elastomer in $(A-B)_n$ type. When n=2, the number of the functional groups of the coupling agent is 2, the elastomer is in a linear structure. When n=4, the number of the functional groups of the coupling agent is 4, the elastomer is in a starlike structure. When $n \geq 4$, the elastomer is in a radiative structure. This process is well known for those who are skilled in the art, for example, U.S. Pat No. 3,393,182 discloses tin tetrachloride as a coupling agent, U.S. Pat. No. 3,281,383 discloses silicon tetrachloride as a coupling agent, U.S. Pat. No. 3,594,452 discloses hexandyl adipate as a coupling agent, U.S. Pat. No. 328,183 discloses epoxidized vegetable oil as a coupling agent and U.S. Pat. No. 3,766,301 discloses phenyl benzoate as a coupling agent. However, this process disclosed in these patents has the following drawbacks:

1. Tin tetrachloride or silicon tetrachloride easily produces a residual chloride salt which corrodes the manufacturing instruments and equipment.
2. When a chlorine-free compound is used as a coupling agent, the impurities formed during the coupling reaction, such as alcohol, phenol, etc., increase the difficulty in the subsequent treatment of water, or in the refinement of solvent.

Furthermore, the coupling efficiency will significantly affect the elastic property of the product regardless of what the coupling agent is. Additionally, the residual impurities after the coupling reaction make the product inferior in transparency and elastomeric properties. When the mono-vinyl aromatic hydrocarbon is styrene and the conjugated diene is butadiene, the polymerized block copolymer is not suitable for adhering because of its weak tackiness and high peel strength.

U.S. Pat. No. 4,600,749 discloses the use of a mono-lithium initiator to polymerize a mixture of a mono-vinyl aromatic hydrocarbon and a conjugated diene. After the polymerization is complete, further mixture of a mono-vinyl aromatic hydrocarbon and a conjugated diene is added to continuously proceed with further polymerization reaction. This process can produce a thermoplastic block elastomer in a type of B-A-B-A. However, the reaction rate of this process is very slow without the addition a polar solvent, and the amount of mono-vinyl aromatic hydrocarbon polymerized at the first step must be substantially equal to the amount of mono-vinyl aromatic hydrocarbon polymerized at the second step. Thus, this process is not easy to control, and the features of the product are unpredictable, such as the hardness, etc.

In view of the foregoing conventional processes, there are numerous drawbacks which have yet to be overcome, such as:

the initiator is unstable;
the polymerization process is too complex;
the efficiency of coupling reaction is low; and
the reaction rate is low.

Furthermore, the SBS type copolymer produced by conventional processes would have the so-called necking phenomenon which reduces the elastic resilience. Additionally, these processes can only provide a polymer with a restricted structure other than a broad spectrum of polymeric structures.

The present invention provides an effective process for preparing a block thermoplastic elastomer substantially based on mono-vinyl aromatic hydrocarbons and conjugated dienes with the use of a mono-lithium initiator. The elastomer produced by the instant process has better elastomeric properties than those produced by conventional processes, and has no necking phenomenon. Additionally, the present elastomer possesses better tack co-efficient, thus it is suitable to be used as a glue for an adhesive tape and/or label.

The present invention also provides a novel process for forming two polymers with different polymeric structures. Thus, it is not necessary to use different reactors to primitively polymerize these polymers with different polymeric structures, nor to then blend and polymerize these polymers in a reactor.

The polymers produced by the present process have the features that:

the ultimate elongation is up to 900%;
the tensile strength is in a range of 100 to 200 kg/cm$^2$;
the 300% modulus is below 35 kg/cm$^2$; and
the product can be used in the field of adhesives, and possesses excellent transparency, thus, it can be used for producing transparent shoe soles.

The novel process according to the present invention for preparing a mixture combining different block copolymers, comprises two steps:

1) under inert atmosphere and in a polar solvent-containing hydrocarbon organic solvent, subjecting mono-vinyl aromatic hydrocarbon monomer (A1), hydrocarbon solvents and polar ether compounds into a reactor, then adding a mono-lithium initiator (I1) to initiate a polymerization reaction;

2) as the conversion of the mono-vinyl aromatic hydrocarbon monomer exceeds 95%, such as when the conversion of the mono-vinyl aromatic hydrocarbon monomer (A1) reaches 99.9 k, a mixture of a mono-vinyl aromatic hydrocarbon monomer (A2) and a conjugated diene monomer (B) is immediately added to the same reactor, and further mono-lithium initiator (I2) is added within 4 hours from the addition of the mixture to obtain a mixture having different polymeric structures.

The amount of said mono-vinyl aromatic hydrocarbon monomer (A1+A2) is 15–90% by weight of the total weight of all the monomers.

The weight ratio between the initiator (I1) used at 1) step and the initiator (I2) used at 2) step is in a ratio of 50:1 to 1:1, and the weight ratio of $A_1/A_2$ is 5/1 to 1/5.

Another process according to the invention for preparing a mixture combining different block copolymers comprises the following steps:

1) subjecting mono-vinyl aromatic hydrocarbon monomer, hydrocarbon solvents and ether polar compounds into a reactor, wherein the polar ether compounds are selected from the group comprising tetrahydrofuran, furan, diethyl ether, dipropyl ether, cyclic pentyl ether, ethylene glycol dimethyl ether, ethylene glycol diethyl ether, ethylene glycol dibutyl ether, diglycol dimethyl ether, then adding a mono-lithium initiator to initiate reaction;

2) as the conversion of the mono-vinyl aromatic hydrocarbon monomer exceeds 95%, a mixture of further mono-vinyl aromatic hydrocarbon monomer and conjugated diene monomer is immediately added to the same reactor, and further mono-lithium initiator is added within 4 hours to obtain a mixture having different polymeric structures, wherein the number mean molecular weight of the mixture is in the range of 30,000 to 500,000, and the amount of said mono-vinyl aromatic hydrocarbon monomer is 15–90% by weight of the total weight of all the monomers, characterized in that:

the initiator is added in the time range of 1 minute to 2 hours, and the initiators at step 1) and step 2) are added in the weight ratio of 1 to 50, and the initiator at step 2) is added within 4 hours after the addition of mono-vinyl aromatic hydrocarbon and conjugated diene.

The conjugated diene monomer (B) used in the present invention has 4 to 6 carbon atoms. Examples of the conjugated diene monomer (B) are 1,3-butadiene, isoprene, 2,3-dimethyl-1,3-butadiene and 1,3-pentadiene. The preferred conjugated diene monomer is 1,3-butadiene or isoprene. These dienes can be used separately, or be used as a mixture comprising two or more dienes.

The mono-vinyl aromatic hydrocarbons (A1 and A2) according to the present invention comprise only one vinyl group. Examples of the mono-vinyl aromatic hydrocarbons (A1 and A2) are styrene, p-methylstyrene, m-methylstyrene, o-methylstyrene, p-ethylstyrene, m-ethylstyrene, o-ethylstyrene, α-vinylnaphthene, β-vinylnaphthene and α-methylstyrene. The preferred mono-vinyl aromatic hydrocarbon is styrene. They can be used separately, or be used as a mixture comprising two or more mono-vinyl aromatic hydrocarbons.

The organic hydrocarbon solvent according to the present invention is just a medium for polymerizing reaction.

Examples of the organic hydrocarbon solvent are adiphatic type solvents, such as pentane, hexane, heptane, octane and decane, cycloalkanes, such as cyclopentane, cyclohexane, methylcyclohexane, ethylcyclohexane and 1,4-dimethylcyclohexane, and aromatic hydrocarbon solvents, such as benzene, toluene, ethylbenzene, xylene, diethylbenzene and propylbenzene. These organic hydrocarbon solvents can be used separately, or be used as a mixture comprising two or more organic hydrocarbon solvents.

Generally, the addition of polar hydrocarbon solvents can reduce the difference in reactivities between the mono-vinyl aromatic hydrocarbon and conjugated diene, and promote the polymerization rate thereof. However, if too much of the polar hydrocarbon solvents is added, the arrangement of the mono-vinyl aromatic hydrocarbon monomer and the conjugated diene monomer in the block copolymer will be confounded, that is, the polymeric structure of the obtained copolymer will be changed from a block structure to a random structure. Thus, the amount range of the polar hydrocarbon solvent which can be used is determined based on the total amounts of the mono-vinyl aromatic hydrocarbon monomer and the conjugated diene monomer, so as to ensure the polymeric structure of the obtained copolymer is a block structure. Examples of the polar hydrocarbon solvent according to the present invention are ethers, such as tetrahydrofuran, furan, diethyl ether, dipropyl ether, cyclic pentyl ether, ethylene glycol dimethyl ether, ethylene glycol diethyl ether, ethylene glycol dibutyl ether, diglycol dimethyl ether, preferably tetrahydrofuran and tertiary amines, such as trimethyl amine, triethyl amine and tripropyl amine, preferably triethyl amine.

The mono-lithium initiator according to the present invention comprises metal lithium or organic lithium compounds of alkyl, cycloalkyl or aromatic hydrocarbyl, such as methyllithium, ethyllithium, propyllithium, butyllithium, tertbutyl lithium, pentyl lithium, phenyllithium, hexyllithium, 2-ethylhexyllithium, cyclohexyllithium, benzyllithium, ethylphenyllithium and xylyllithium. Among these initiators, it is preferred to use n-butyllithium or sec-butyllithium.

During the process of preparing a mixture with different block copolymers, the polymerizing system must be kept in a status of being impurity-free. Examples of the impurities are water, oxygen, carbon dioxide, alkynyls, halogens, alkanols, organic acids or inorganic acids. The mono-vinyl aromatic hydrocarbons and conjugated dienes must also be purified before polymerization reaction, and the purifying process must also be carried under nitrogen, argon or helium atmosphere.

The amount of the mono-vinyl aromatic hydrocarbon monomer used in steps 1) and 2) is 15–90% by weight of the total weight of all the monomers. When the amount is greater than 90 wt %, the elastomeric properties of the product will reduce dramatically and show more plastic-like features. Additionally, precipitates are easily formed during the polymerization process, which make the reaction solution unclear, thus inducing the monomers to be not able to polymerize homogeneously. When the amount is less than 15 wt %, the physical properties (especially elasticity) of the product are significantly destroyed, tensile strength thereof reduces and thermal degradation occurs easily.

The preferred temperature range of proceeding with the polymerization reaction is −30° C. to 150° C., more preferably 30° C. to 100° C. If the temperature is too high, the active lithium end of the organic lithium initiator will be inactivated, then, the polymerization reaction is terminated. Further, the possibility of impurities being reacted with active lithium end of the organic lithium initiator increases.

The weight ratio of organic lithium initiator (I1) to organic lithium initiator (I2) is about 1 to 50. When the ratio is less than 1, the obtained product do not possess the features of an elastomer, and has low hardness and low tensile strength. When the ratio is more than 50, the obtained product is a triblock copolymer, thus its transparency becomes inferior and its ultimate elongation rate cannot reach 900%. Additionally, the tackiness or quick stick is low when formulated as an adhesive in the primitive stage.

The organic lithium initiator (I2) of step 2) should be added at the time that the mono-vinyl aromatic hydrocarbons and the dienes are added and react with one another, or are added within 4 hours after the beginning of the polymerization reaction. If the organic lithium initiator (I2) of step 2) is added later than 4 hours after the beginning of the polymerization, the product yield becomes very low, and, thus is uneconomical. Furthermore, the amount of the second polymer is too low if the organic lithium initiator (I2) of step 2) is added later than 4 hours after the beginning of the polymerization, thus the desired block copolymer according to the present invention cannot be achieved. Additionally, the delay of the addition of the organic lithium initiator (I2) into the reactor will cause the too-low molecular weight polymer to occur. As a result, the polymer will adhere to inner wall of the reactor, or plug the tubes connected to the reactor as stripping. Generally, the organic lithium initiator (I2) is added during a process lasting for 1 minute to 2 hours.

The weight amount ratio of the mono-vinyl aromatic hydrocarbon (A1) to the mono-vinyl aromatic hydrocarbon (A2) is 5 to 0.2. When the ratio is higher than 5 or less than 0.2, the heat resistance of the obtained copolymer will be inferior and its hardness or elastomeric properties dramatically reduce.

The desired copolymer according to the present invention is a product of combining the polymers with different structures. In the product, the polymer with a higher molecular weight is 40–99%. of the total polymers, preferably, 60–99% If the amount of the polymer with a higher molecular weight is less than 40%, the tensile strength of the final copolymer is too low to be used in practice. If the amount is higher than 99%, the structure of the obtained copolymer is similar to those well-known block copolymers, such as SBS, thus, making the transparency and resilience of the product inferior. Also, the necking phenomenon cannot be avoided.

According to the present invention, there is at least one stabilizer added after the polymerization reaction so as to protect the polymer against the degradation caused by oxygen, UV radiation, ozone and/or heat. After polymerization, the materials such as water, alkanols, organic acids, inorganic acids and phenols which can react with the active lithium end of the organic lithium initiator could be first added. Or, alternatively, after the final product inactivated, the stabilizer is then added. Alternatively, the stabilizer can be directly added into the reactor to act as a terminator. After the polymerization reaction has been terminated, the final solution and/or suspension is coagulated to particles by using hot water. Finally, the product is finished by vaporizing, drying, filtrating and/or centrifuging.

The number average molecular weight of the present product is $5\times10^3$ to $50\times10^4$. In one embodiment, the number average molecular weight is the range of 30,000 to 500,000. If the molecular weight is less than $5\times10^3$, the mechanical properties, such as tensile strength, would be inferior. If the molecular weight is more than $50\times10^4$, the product is unsuitable for processing. In order to achieve the preferred features, the number average molecular weight is preferably $3.5\times10^4$ to $35\times10^4$.

EXAMPLES

The present invention will be described in further detail with reference to the following examples. These examples are presented for describing the invention only, and are not intended to limit the scope of the present invention in any manner.

EXAMPLE 1

In a 100-liter pressured autoclave equipped with a stirrer and a jacket, 68.8 liters of cyclohexane, 1.4 liters of styrene, and 2 grams of tetrahydrofuran are added. The content in the reactor is heated, and 226 ml of n-butyllithium solution is added when the temperature reaches 62° C. After the conversion of the monomers exceeds 99.9%, a mixture of 6.5 liters of butadiene and 1.7 liters of styrene, and 53 ml of n-butyllithium solution are added to proceed with a second step of polymerization. After the conversion of all the monomers exceeds 99.9%, 0.8 PHR antioxidant (TNPP/Irganox 1076=13/7) is added. PHR means the amount/grams chemicals added per 100 grams of rubber.

The reacting solution possesses two polymers with different polymeric structures due to the addition of the initiator added at step 2). These two polymers are easily miscible. The solid polymers can be recovered from the reaction solution by stripping.

COMPARATIVE EXAMPLE 1

In a 100-liter pressured autoclave equipped with a stirrer and a jacket, 73.8 liters of cyclohexane, 1.8 liters of styrene and 8 grams of tetrahydrofuran are added. The content of the reactor is heated, and 112 ml of n-butyllithium solution is added when the temperature reaches 47° C. After the conversion of the monomers exceeds over 99.9%, 7.3 liters of butadiene is added to proceed with the second stage of polymerization reaction. After the conversion exceeds 99.9%, 1.8. liters of styrene is added to continuously polymerize. When the conversion of the monomers reaches 99.9%, 0.8 PHR antioxidant (TNPP/Irganox 1076=13/7) is added to terminate the activity of the lithium end of the organic lithium initiator. The obtained polymer solution is in a straight block S-B-S type. The solid polymers can be recovered from the reaction solution by stripping.

COMPARATIVE EXAMPLE 2

In a 100-liter pressured autoclave equipped with a stirrer and a jacket, 68.8 liters of cyclohexane, 1.5 liters of styrene are added. When the reactor is heated to 62° C., 270 ml of n-butyl-lithium is added. After the conversion of the monomers has reached 99.9%, 6.35 liters of butadiene and 1.5 liters of styrene are added to the continuously polymerizing reaction. After the conversion of the monomers has reached 99.9%, 0.8 PHR of antioxidant (TNPP/Irganox 1076=13/7) is added to terminate the active lithium end of the organic lithium initiator. The obtained polymer solution is in a straight block S-B-S type. The solid polymers can be recovered from the reaction solution by stripping

RESULTS

TABLE 1

| | Example 1 | Comparative Example 1 | Comparative Example 2 |
|---|---|---|---|
| 300% modulus (kg/cm$^2$) | 29 | 40 | 25 |
| Elongation (%) | 1100 | 710 | 920 |
| Tensile strength (kg/cm$^2$) | 106 | 209 | 105 |
| Transparency (UV 550 nm) % | 80.0 | 66.2 | 70 |
| Hardness (Shore A) | 87 | 87 | 87 |
| Bound styrene (%) | 41.8 | 41.1 | 42.6 |
| Melting index (180° C., 5 kg, g/10 min) | 6.7 | 5.6 | 3.5 |

As can be seen from Table 1, it is apparent that the product of example 1 is more transparent than those of comparative examples. Additionally, the instant copolymer is suitable for processing, and its elongation rate exceeds 1000%. Thus, it can be used in the field of manufacturing adhesive and the transparent shoe soles.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

what is claimed:

1. A process for preparing a mixture of different block copolymers, comprising the following steps of:
    1) adding mono-vinyl aromatic hydrocarbon monomer, hydrocarbon solvent and ether polar compound into a reactor having an inert atmosphere, wherein the polar ether compound is selected from tetrahydrofuran, furan, diethyl ether, dipropyl ether, cyclic pentyl ether, ethylene glycol dimethyl ether, ethylene glycol diethyl ether, ethylene glycol dibutyl ether, or diglycol dimethyl ether, then adding a first mono-lithium initiator to initiate reaction;
    2) as the conversion of the mono-vinyl aromatic hydrocarbon monomer exceeds 95%, a) a mixture of further mono-vinyl aromatic hydrocarbon monomer and conjugated diene monomer is immediately added to the same reactor, and b) a second mono-lithium initiator is added within 4 hours after the beginning of the reaction to obtain a mixture having different polymeric structures,
    wherein the number average molecular weight of the mixture is in the range of 30,000 to 500,000, and the amount of said mono-vinyl aromatic hydrocarbon monomer is 15–90% by weight of the total weight of all the monomers, characterized in that:
    the addition of the second mono-lithium initiator during step 2) lasts 1 minute to 2 hours, and the weight ratio of the first mono-lithium initiator to the second mono-lithium initiator is about 1 to 50, respectively, and the second initiator is added within 4 hours after the addition of mono-vinyl aromatic hydrocarbon and conjugated diene.

2. The process as claimed in claim 1, wherein the mono-vinyl aromatic hydrocarbon is styrene.

3. The process as claimed in claim 1, wherein the conjugated diene is 1,3-butadiene, isoprene, and mixture thereof.

4. The process as claimed in claim 1, wherein the process is carried out in the temperature range of 10–120° C., and in the time range of 30 minutes to 6 hours.

5. The process as claimed in claim 1, wherein the first and second mono-lithium initiators are selected from methyl lithium, ethyl lithium, n-butyl lithium, sec-butyl lithium, tert-butyl lithium, pentyl lithium, phenyl lithium or cyclohexyl lithium.

6. The process as claimed in claim 1, wherein the hydrocarbon solvent is selected from one or two of the following compounds: butane, pentane, n-hexane, cyclohexane, heptane, octane and ethylhexane.

7. The process as claimed in claim 1, wherein the amount ratio between the mono-vinyl aromatic hydrocarbon monomer of step 1) and the mono-vinyl aromatic hydrocarbon monomer of step 2) is in the range of 0.01 to 100.

8. The process as claimed in claim 1, wherein the total added amount of the first and second initiators is 0.01% to 0.50%, based on the total weight of all monomers.

* * * * *